US008538418B2

(12) United States Patent
Syrjärinne et al.

(10) Patent No.: US 8,538,418 B2
(45) Date of Patent: Sep. 17, 2013

(54) EFFICIENT USE OF ASSISTANCE DATA SERVICES IN DUAL/MULTI-SIM TERMINALS

(75) Inventors: Jari Tapani Syrjärinne, Tampere (FI); Jens Christian Schwarzer, Copenhagen S (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/580,363

(22) PCT Filed: Feb. 23, 2010

(86) PCT No.: PCT/IB2010/050792
§ 371 (c)(1),
(2), (4) Date: Nov. 2, 2012

(87) PCT Pub. No.: WO2011/104580
PCT Pub. Date: Sep. 1, 2011

(65) Prior Publication Data
US 2013/0079000 A1    Mar. 28, 2013

(51) Int. Cl.
*H04W 4/00* (2009.01)
(52) U.S. Cl.
USPC ......... 455/427; 455/552.1; 455/558; 455/557

(58) Field of Classification Search
USPC .............................. 455/427, 552.1, 558, 557
See application file for complete search history.

(56) References Cited

U.S. PATENT DOCUMENTS

| 2002/0006808 | A1* | 1/2002 | Onaka et al. | 455/550 |
| 2010/0328158 | A1* | 12/2010 | Savolainen | 342/451 |
| 2011/0071926 | A1* | 3/2011 | Wirola et al. | 705/27.1 |
| 2011/0117879 | A1* | 5/2011 | Radic et al. | 455/404.2 |

\* cited by examiner

*Primary Examiner* — Barry Taylor
(74) *Attorney, Agent, or Firm* — Nokia Corporation

(57) ABSTRACT

Method, apparatus, and computer program product example embodiments of the invention are disclosed for providing flexibly in selecting sources for Assisted Global Navigation Satellite Systems (A-GNSS) services. Example embodiments include at least two SIM modules in a wireless communications device to enable accessing at least two different wireless carriers to obtain at least two different sets of A-GNSS capability information. Optimal A-GNSS features are selected from the A-GNSS capability information from the at least two different wireless carriers and combined into a composite set of optimal A-GNSS features. Example embodiments of the invention may include a wireless communications device having at least two SIM modules sharing one or more RF modems.

24 Claims, 9 Drawing Sheets

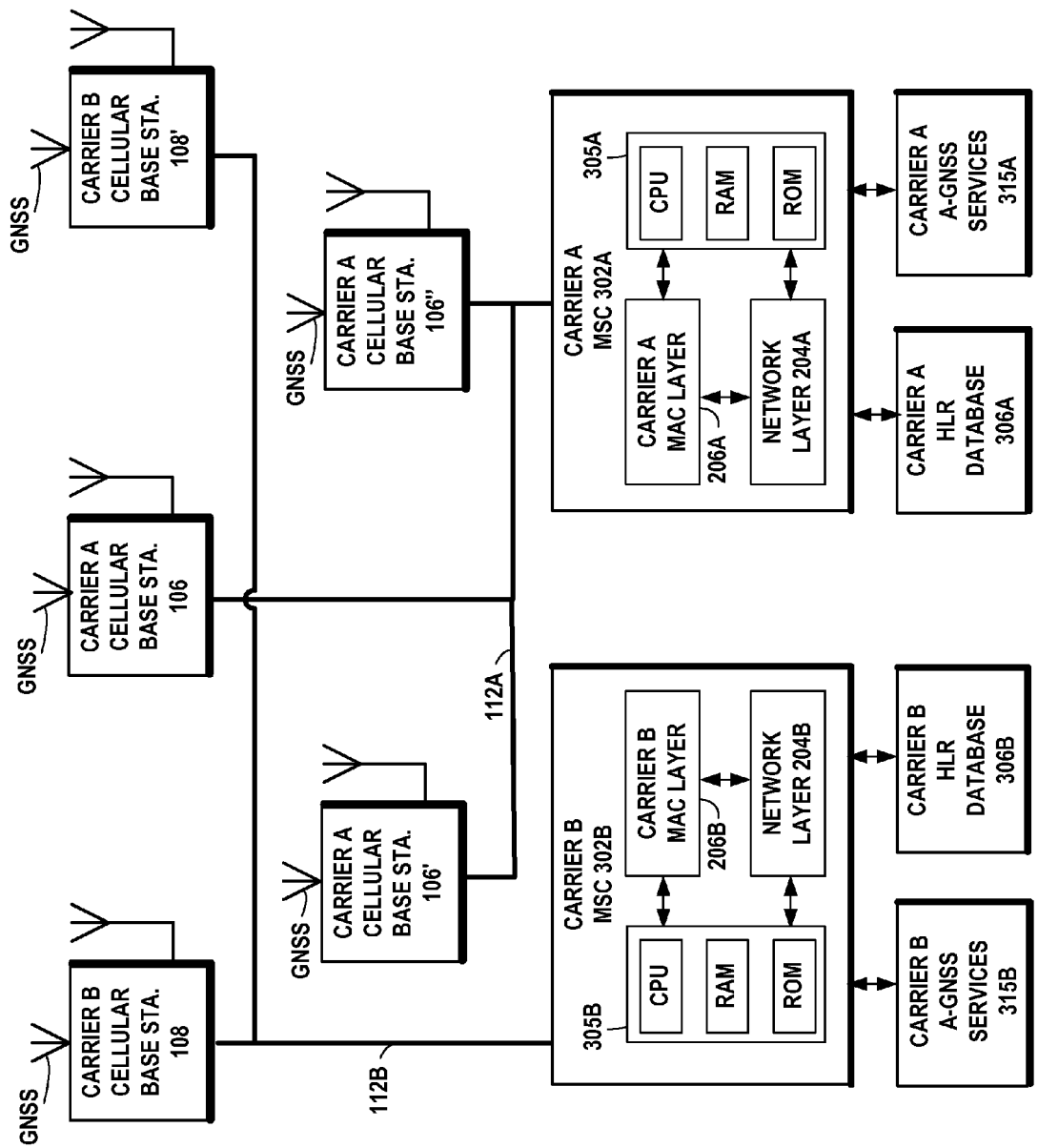

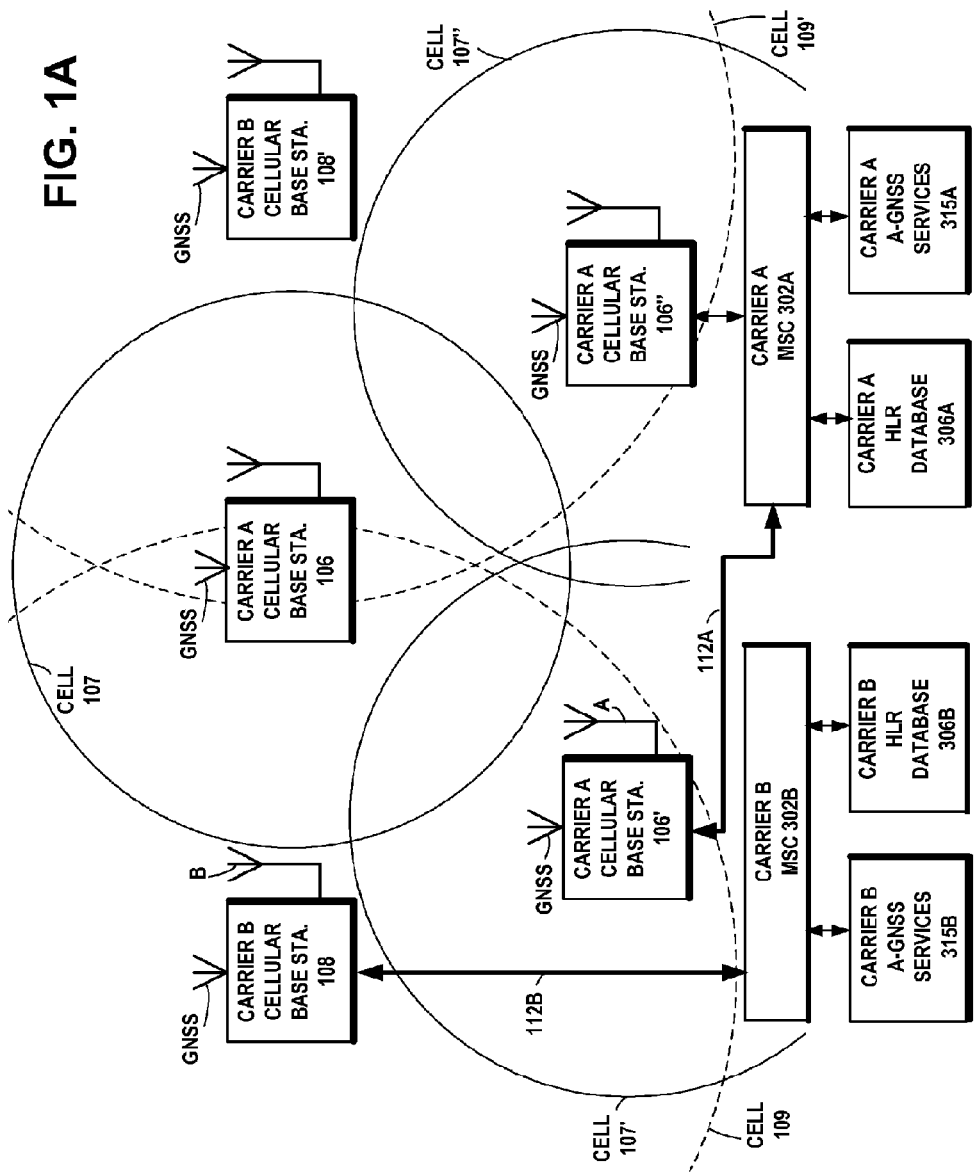

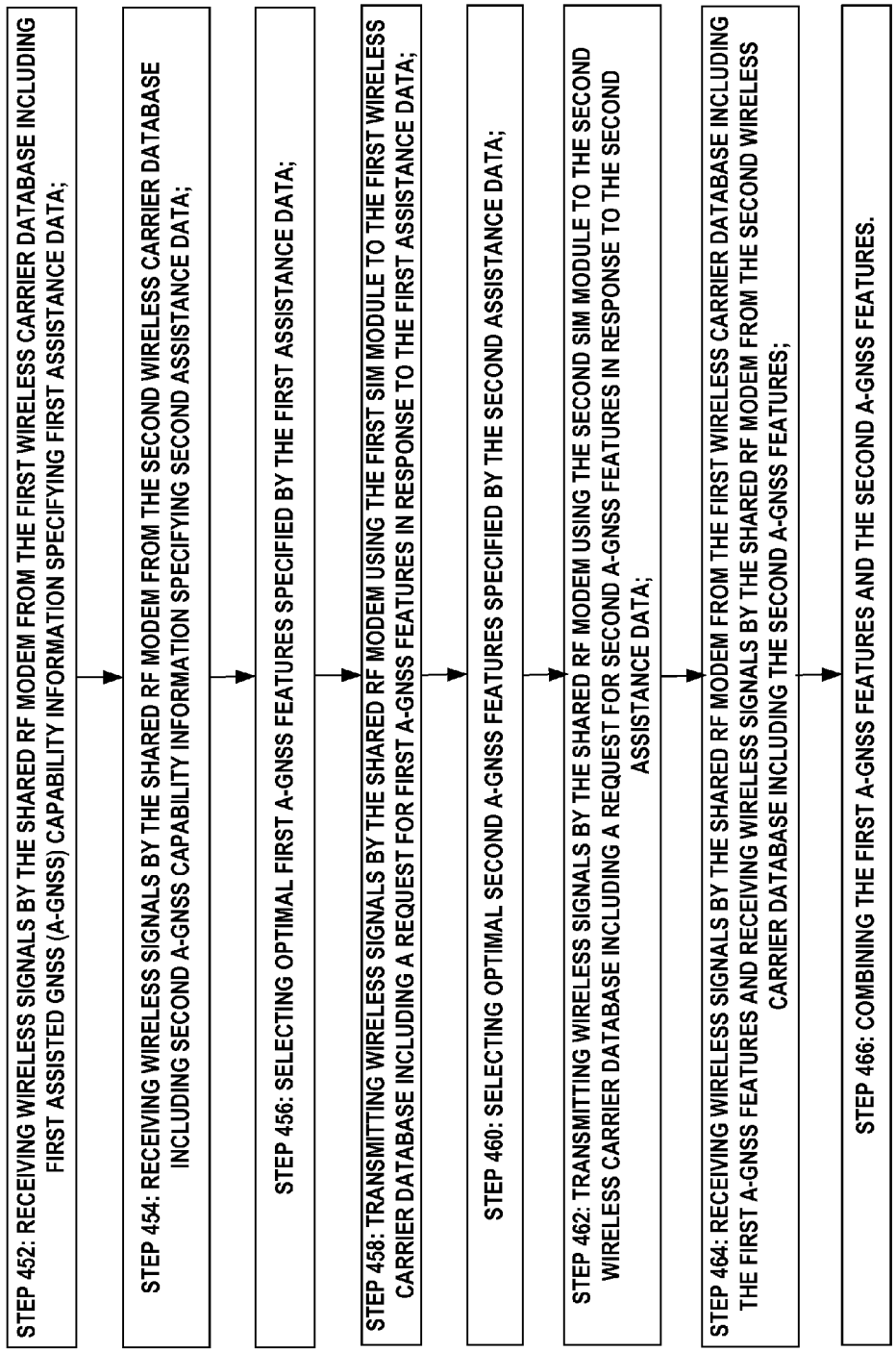

EFFICIENT USE OF ASSISTANCE DATA SERVICES IN DUAL/MULTI-SIM TERMINALS

RELATED APPLICATION

This application was originally filed as PCT Application No. PCT/IB2010/050792 filed Feb. 23, 2010.

FIELD

The technical field relates to geographical location determination for wireless communications devices. More particularly, the technical field relates to providing flexibly in selecting sources for assisted Global Navigation Satellite Systems (GNSS) services.

BACKGROUND

Global Navigation Satellite Systems (GNSS) is a collective term covering various types of satellite navigation technologies, such as the Global Positioning System (GPS). Assisted-GNSS (A-GNSS) enables faster position determination in a mobile wireless device than can be obtained using only the broadcast GNSS satellite data, by providing assistance data from the wireless network, such as ephemeris data, clock corrections, and reference locations. The A-GNSS technology has been standardized in the Open Mobile Alliance (OMA) standard: *Open Mobile Alliance, User Plane Location Protocol Candidate Version* SUPL2.0: OMA-TS-ULP-V2_0-20091208-C, December 2009.

Open Mobile Alliance (OMA) SUPL (Secure User Plane Location protocol) Release 1 (SUPL1.0), Release 2 (SUPL2.0), and Release 3 (SUPL3.0) have considerable differences in their A-GNSS capabilities due to technical evolution and improvements added in the later releases. Also, a carrier's proprietary A-GNSS services and features may offer better performance than the standardized solutions.

The Third Generation Partnership Project (3GPP) defines A-GNSS positioning protocols for GERAN (GSM EDGE Radio Access Network), UTRAN (UMTS Terrestrial RAN) and E-UTRAN (Enhanced UTRAN) or LTE (Long-Term Evolution). The positioning protocols for CDMA (Code Division Multiple Access) networks are defined by 3GPP2. The assistance may include the navigation model (orbit and clock parameters), reference location and reference time. In an assisted situation, the receiver does not need to download the navigation model from the satellites, but receives it over the cellular network to significantly reduce the time to first fix and enable accurate positioning in adverse signal conditions. Each 3GPP location protocol includes carrier-specific items such as time difference and round trip time measurements and different formats for orbit and clock parameters, reference location and reference time. Carriers are at liberty to charge different rates for these services.

SUMMARY

Method, apparatus, and computer program product example embodiments of the invention are disclosed for providing flexibly in selecting sources for Assisted Global Navigation Satellite Systems (A-GNSS) services. Example embodiments include at least two SIM modules in a wireless communications device to enable accessing at least two different wireless carriers to obtain at least two different sets of A-GNSS capability information. Optimal A-GNSS features are selected from the A-GNSS capability information from the at least two different wireless carriers and combined into a composite set of optimal A-GNSS features. Example embodiments of the invention may include a wireless communications device having at least two SIM modules to access at least two different subscription plans of the same carrier.

Example embodiments of the invention may include a wireless communications device that may have the following components.

At least a first SIM module is configured to access a first wireless carrier and a second SIM module configured to access a second wireless carrier.

At least a first RF modem is configured to communicate with the first wireless carrier and a second RF modem configured to communicate with the second wireless carrier.

At least one global navigation satellite system receiver is included.

At least one processor is included.

At least one memory including computer program code is included.

The at least one memory and the computer program code configured to, with the at least one processor, cause the wireless communications device at least to:

Cause satellite signals to be received from a global navigation satellite system.

Cause wireless signals to be received by the first RF modem from the first wireless carrier including first A-GNSS capability information specifying first assistance data supported by the first carrier.

Cause wireless signals to be received by the second RF modem from the second wireless carrier including second A-GNSS capability information specifying second assistance data supported by the second carrier.

Compare the first capability information from the first carrier with the second capability information from the second carrier.

Select optimal first A-GNSS features specified by the first assistance data.

Cause wireless signals to be transmitted by the first RF modem to the first wireless carrier including a request to the first carrier for first A-GNSS features.

Select optimal second A-GNSS features specified by the second assistance data.

Cause wireless signals to be transmitted by the second RF modem to the second wireless carrier including a request to the second carrier for second A-GNSS features.

Cause wireless signals to be received by the first RF modem from the first wireless carrier including the first A-GNSS features from the first carrier.

Cause wireless signals to be received by the second RF modem from the second wireless carrier including the second A-GNSS features from the second carrier.

The first and second wireless carriers may be cellular telephone carriers. The wireless communications device and first wireless carrier may engage in an A-GNSS capability handshake and the wireless communications device and the second wireless carrier engage in an A-GNSS capability handshake. An A-GNSS services memory in the wireless communications device coupled to both the first RF modem and the second RF modem, may be configured to store the first A-GNSS features from the first carrier and second A-GNSS features from the second carrier. The at least one memory and the computer program code configured to, with the at least one processor, cause the wireless communications device at least to combine the first A-GNSS features from the first carrier and the second A-GNSS features from the second carrier.

Example embodiments of the method of the invention may further include the following steps:

Receiving satellite signals from a global navigation satellite system.

Receiving wireless signals by a first RF modem from a first wireless carrier including first A-GNSS capability information specifying first assistance data supported by the first carrier.

Receiving wireless signals by a second RF modem from a second wireless carrier including second A-GNSS capability information specifying second assistance data supported by the second carrier.

Comparing the first capability information from the first carrier with the second capability information from the second carrier.

Selecting optimal first A-GNSS features specified by the first assistance data.

Transmitting wireless signals by the first RF modem to the first wireless carrier including a request to the first carrier for the first A-GNSS features.

Selecting optimal second A-GNSS features specified by the second assistance data.

Transmitting wireless signals by the second RF modem to the second wireless carrier including a request to the second carrier for the second A-GNSS features.

Receiving wireless signals by the first RF modem from the first wireless carrier including the first A-GNSS features from the first carrier.

Receiving wireless signals by the second RF modem from the second wireless carrier including the second A-GNSS features from the second carrier.

The method of the invention may further include combining the first A-GNSS features from the first carrier and the second A-GNSS features from the second carrier.

Example embodiments of the invention may include a computer readable medium storing program instructions, which when executed by a computer processor, perform the steps of the above recited method.

Example embodiments of the invention may include a wireless communications device having at least two SIM modules to access two different subscription plans of the same carrier. The wireless communications device may have the following components:

at least a first SIM module configured to access a first subscription plan of a wireless carrier and a second SIM module configured to access a second subscription plan of the wireless carrier;

at least one RF modem configured to communicate with the wireless carrier;

at least one global navigation satellite system (GNSS) receiver;

at least one processor;

at least one memory including computer program code;

the at least one memory and the computer program code configured to, with the at least one processor, cause the apparatus at least to:

cause satellite signals to be received from a global navigation satellite system;

cause wireless signals to be received by the at least one RF modem from the wireless carrier including first assisted GNSS (A-GNSS) capability information specifying first assistance data supported by the first subscription plan;

cause wireless signals to be received by the at least one RF modem from the wireless carrier including second A-GNSS capability information specifying second assistance data supported by the second subscription plan;

select optimal first A-GNSS features specified by the first assistance data for the first subscription plan;

cause wireless signals to be transmitted by the at least one RF modem using the first SIM module to the wireless carrier including a request to the carrier for first A-GNSS features in response to the first assistance data for the first subscription plan;

select optimal second A-GNSS features specified by the second assistance data for the second subscription plan;

cause wireless signals to be transmitted by the at least one RF modem using the second SIM module to the wireless carrier including a request to the carrier for second A-GNSS features in response to the second assistance data for the second subscription plan;

cause wireless signals to be received by the at least one RF modem from the wireless carrier including the first A-GNSS features for the first subscription plan and cause wireless signals to be received by the at least one RF modem from the wireless carrier including the second A-GNSS features for the second subscription plan; and combine the first A-GNSS features for the first subscription plan and the second A-GNSS features for the second subscription plan.

Example embodiments of the invention may include a method for a wireless communications device having at least two SIM modules to access two different subscription plans of the same carrier. The method may have the following steps.

receiving wireless signals from a wireless carrier including first assisted GNSS (A-GNSS) capability information specifying first assistance data supported by a first subscription plan;

receiving wireless signals from the wireless carrier including second A-GNSS capability information specifying second assistance data supported by a second subscription plan;

selecting optimal first A-GNSS features specified by the first assistance data for the first subscription plan;

transmitting wireless signals using a first SIM module to the wireless carrier including a request to the carrier for first A-GNSS features in response to the first assistance data for the first subscription plan;

selecting optimal second A-GNSS features specified by the second assistance data for the second subscription plan;

transmitting wireless signals using a second SIM module to the wireless carrier including a request to the carrier for second A-GNSS features in response to the second assistance data for the second subscription plan;

receiving wireless signals from the wireless carrier including the first A-GNSS features for the first subscription plan and receive wireless signals from the wireless carrier including the second A-GNSS features for the second subscription plan; and combining the first A-GNSS features for the first subscription plan and the second A-GNSS features for the second subscription plan.

Example embodiments of the invention may include a wireless communications device having at least two SIM modules that share the same RF modem. The first SIM module is configured to access first information of a first wireless carrier database and the second SIM module is configured to access second information of a second wireless carrier database. In an example embodiment of the invention, the first wireless carrier database and the second wireless carrier database are operated by the same carrier. In another example embodiment of the invention, the first wireless carrier database and the second wireless carrier database are operated by the same carrier and the first database and the second database are component parts of the same database. In another example embodiment of the invention, the first wireless carrier database is operated by a first wireless carrier and the second wireless carrier database is operated by a second wireless carrier different from the first wireless carrier. The example wireless communications device may have the following components:

a first SIM module configured to access first information of a first wireless carrier database and a second SIM module configured to access second information of a second wireless carrier database;

an RF modem shared by the first and second SIM modules, configured to communicate with the first wireless carrier database and the second wireless carrier database;

at least one global navigation satellite system (GNSS) receiver;

at least one processor;

at least one memory including computer program code;

the at least one memory and the computer program code configured to, with the at least one processor, cause the apparatus at least to:

cause satellite signals to be received from a global navigation satellite system;

cause wireless signals to be received by the shared RF modem from the first wireless carrier database including first assisted GNSS (A-GNSS) capability information specifying first assistance data;

cause wireless signals to be received by the shared RF modem from the second wireless carrier database including second A-GNSS capability information specifying second assistance data;

select optimal first A-GNSS features specified by the first assistance data;

cause wireless signals to be transmitted by the shared RF modem using the first SIM module to the first wireless carrier database including a request for first A-GNSS features in response to the first assistance data;

select optimal second A-GNSS features specified by the second assistance data;

cause wireless signals to be transmitted by the shared RF modem using the second SIM module to the second wireless carrier database including a request for second A-GNSS features in response to the second assistance data;

cause wireless signals to be received by the shared RF modem from the first wireless carrier database including the first A-GNSS features and cause wireless signals to be received by the shared RF modem from the second wireless carrier database including the second A-GNSS features; and combine the first A-GNSS features and the second A-GNSS features.

Example embodiments of the invention may include a computer readable medium storing program instructions, which when executed by a computer processor, perform the steps of the above recited method.

The resulting embodiments improve flexibly in selecting sources for assisted Global Navigation Satellite Systems (GNSS) services.

DESCRIPTION OF THE FIGURES

A more complete understanding of the example embodiments of the invention is made with reference to the following figures.

FIG. 1 illustrates an example geographical area served by two different cellular carriers.

FIG. 1A illustrates the example geographical area of FIG. 1, illustrating the coverage area of several base stations of the two different cellular carriers.

FIG. 6 illustrates a flow diagram of an example embodiment of the process to engage in an A-GNSS capability handshake by the wireless device of FIG. 5 having at least two SIM modules that share the same RF modem.

DISCUSSION OF EXAMPLE EMBODIMENTS OF THE INVENTION

Method, apparatus, and computer program product example embodiments of the invention are disclosed for providing flexibly in selecting sources for Assisted Global Navigation Satellite Systems (A-GNSS) services. Example embodiments include at least two SIM modules in a wireless communications device to enable accessing at least two different wireless carriers to obtain at least two different sets of A-GNSS capability information. Optimal A-GNSS features are selected from the A-GNSS capability information from the at least two different wireless carriers and combined into a composite set of optimal A-GNSS features.

FIG. 1 illustrates an example geographical area served by two different wireless carriers A and B operating in non-overlapping portions of the radio spectrum. The wireless carriers may be cellular telephone networks using network protocols such as GERAN (GSM EDGE Radio Access Network), UTRAN (UMTS Terrestrial RAN) or WCDMA (Wide-band CDMA), E-UTRAN (Enhanced UTRAN) or LTE (Long-Term Evolution), and CDMA (Code Division Multiple Access) networks. The wireless carriers A and B may also be wireless local area networks (WLAN) using any one of the IEEE 802.11 WLAN protocols or HyperLAN protocols.

The example carriers A and B of FIG. 1 are cellular telephone networks, for example carrier A may be GERAN (GSM EDGE Radio Access Network) and carrier B may be WCDMA (Wide-band CDMA). In this example, both carrier A and carrier B provide a standard set of A-GNSS features such as orbit and clock parameters, reference location and reference time. Carrier A charges its subscribers a lower rate for its A-GNSS features than does carrier B. However, Carrier B offers proprietary GNSS assistance data services, such as autonomous predicted ephemeris generation in the terminal, for which it can charge its higher rate to its subscribers.

Carrier A's cellular telephone network 112A includes cellular base stations 106, 106', and 106", each of which is connected to carrier A's mobile switching center (MSC) 302A. Carrier B's cellular telephone network 112B includes cellular base stations 108 and 108', each of which is connected to carrier B's mobile switching center (MSC) 302B. FIG. 1A illustrates the example geographical area of FIG. 1, illustrating the coverage area of the several base stations of the two different cellular carriers A and B. Carrier A's cellular base stations 106, 106', and 106" cover the respective cells 107, 107', and 107". Carrier B's cellular base stations 108 and 108' cover the respective cells 109 and 109'.

Figure 1B:
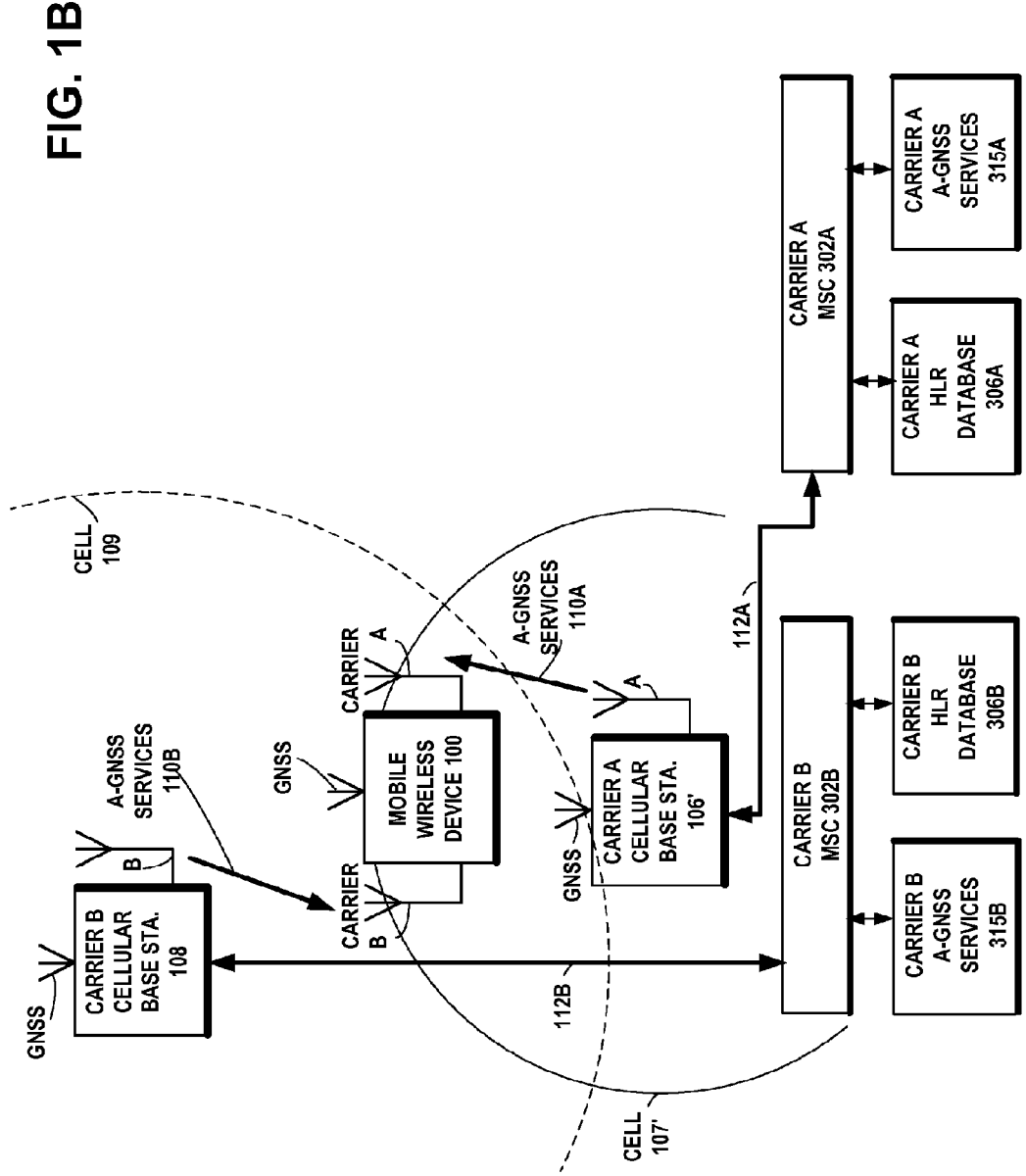
FIG. 1B illustrates the example geographical area of FIGS. 1 and 1A, where an example embodiment of a multi-SIM mobile wireless device having a GNSS location detection capability, has moved into a location covered by a first carrier's base station and a second carrier's base station.

FIG. 1B illustrates the example geographical area of FIGS. 1 and 1A, where an example embodiment of a multi-SIM mobile wireless device 100 having a GNSS location detection capability, has moved into a location covered by carrier A's base station 106' and carrier B's base station 108. The geographical area is served by the two different cellular carriers A and B operating in non-overlapping portions of the radio spectrum.

Figure 1C:
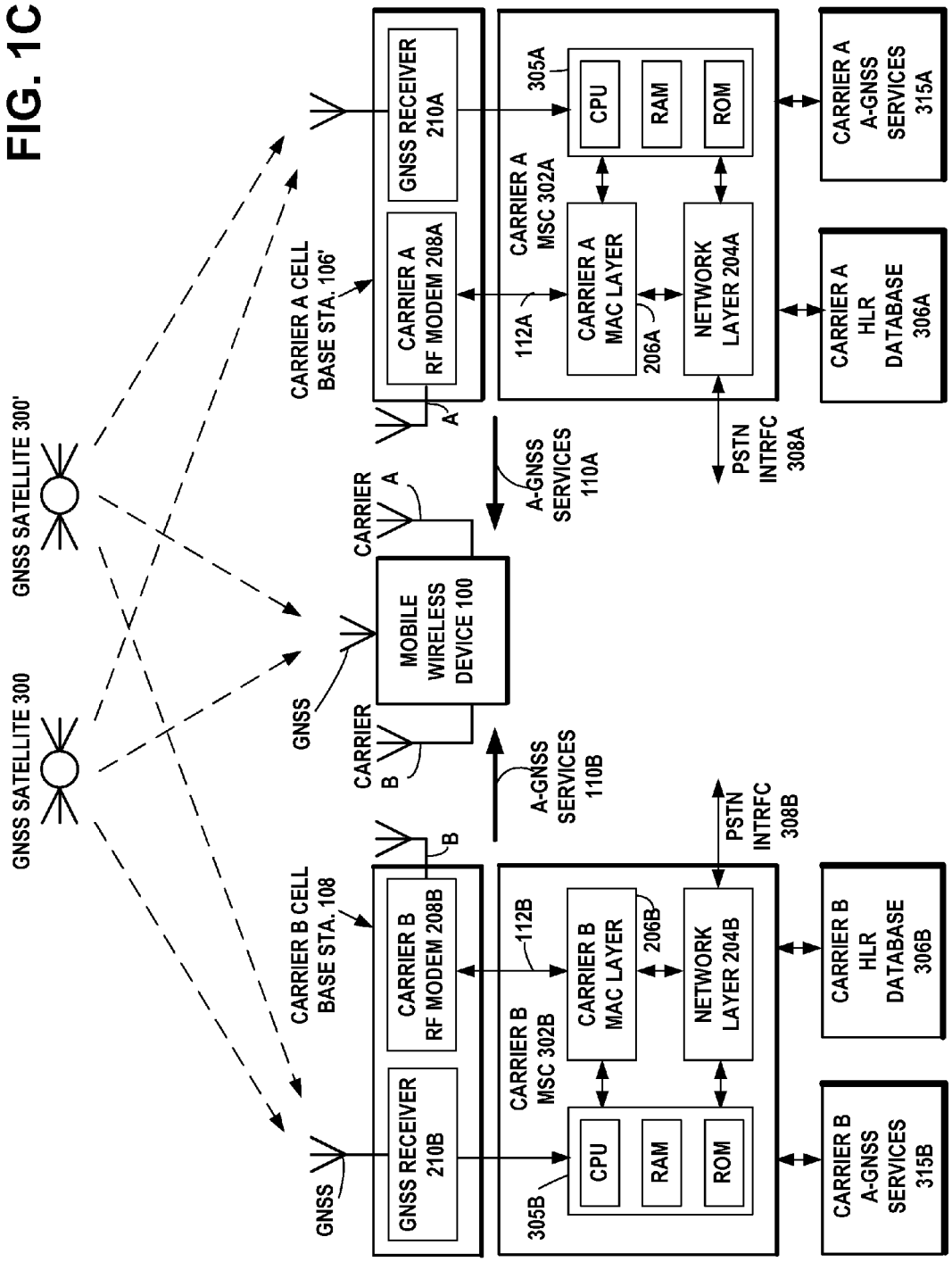
FIG. 1C illustrates the example embodiment of FIG. 1B, where the mobile wireless device engages in an A-GNSS capability handshake with the first carrier and an A-GNSS capability handshake with the second carrier.

GNSS receivers 210A and 210B in FIG. 1C at each respective base station 106' and 108, perform position determination by receiving broadcast GNSS satellite data from GNSS satellites 300 and 300' and provide that data to the respective mobile switching centers 302A and 302B. In the example embodiment, each respective base station 106' and 108 in FIG. 1C, has a cellular telephone RF modem 208A and 208B, to communicate with wireless devices such as device 100 of FIG. 2. Cellular telephone traffic and the GNSS satellite data is exchanged by each respective base station 106' and 108, with their respective mobile switching centers 302A and 302B.

Each respective mobile switching center 302A and 302B includes a protocol stack that may include a network layer 204A and 204B, which may connect to the public switched telephone network (PSTN) through respective interfaces 308A and 308B in FIG. 1C. The protocol stack in mobile switching center (MSC) 302A for carrier A, will include a MAC layer 206A to communicate through the RF modem 208A at the base station 106' with the RF modem 208 in the wireless device 100 of FIG. 2. The protocol stack in mobile switching center (MSC) 302B for carrier B, will include a MAC layer 206B to communicate through the RF modem 208B at the base station 108 with the RF modem 208' in the wireless device 100 of FIG. 2.

Mobile switching center (MSC) 302A includes a home location register (HLR) 306A database that contains carrier A's subscriber authorization information for the wireless device 100. The Mobile switching center (MSC) 302A includes a database for A-GNSS services 315A that stores the A-GNSS service features that are available to the subscribers of carrier A, for the position determination service using assisted Global Navigation Satellite Systems (A-GNSS). A-GNSS services 315A for carrier A is a standard set of A-GNSS features such as orbit and clock parameters, reference location and reference time and carrier A charges its subscribers a relatively low rate for its A-GNSS features. Carrier A's HLR 306A and A-GNSS services 315A may be accessed by the wireless device 100 using the subscriber identity module (SIM) 230 and its RF modem or transceiver 208 of FIG. 2. When the wireless device 100 accesses the carrier A's base station 106', it uses the service-subscriber key (IMSI) stored in the SIM module 230. The IMSI is received by the RF modem 208A of the carrier A's base station 106' and sent to the carrier A's Home Location Register (HLR) 306A or as locally copied in a Visitor Location Register. The HLR 306A database contains the subscriber authorization information for the wireless device 100.

Mobile switching center (MSC) 302B includes a home location register (HLR) 306B database that contains the carrier B's subscriber authorization information for the wireless device 100. The Mobile switching center (MSC) 302B includes a database for A-GNSS services 315B that stores the A-GNSS service features that are available to the subscribers of carrier B, for the position determination service using assisted Global Navigation Satellite Systems (A-GNSS). A-GNSS services 315B for carrier B is a standard set of A-GNSS features such as orbit and clock parameters, reference location and reference time and carrier B charges its subscribers a relatively high rate for its A-GNSS features. A-GNSS services 315B for carrier B also includes proprietary GNSS assistance data services, such as autonomous ephemeris generation in the terminal, for which it charges its higher rate to its subscribers. Carrier B's HLR 306B and A-GNSS services 315B may be accessed by the wireless device 100 using the subscriber identity module (SIM) 230' and its RF modem or transceiver 208' of FIG. 2. When the wireless device 100 accesses the carrier B's base station 108, it uses the service-subscriber key (IMSI) stored in the SIM module 230'. The IMSI is received by the RF modem 208B of the carrier B's base station 108 and sent to the carrier B's Home Location Register (HLR) 306B or as locally copied in a Visitor Location Register. The HLR 306B database contains the subscriber authorization information for the wireless device 100.

In this example, the wireless device 100 is conducting two A-GNSS capability handshake sessions. The first A-GNSS capability handshake session 110A is within cell 107' with carrier A's cellular base station 106'. The device 100 uses its first subscriber identity module (SIM) 230 and its first device modem or transceiver 208 of FIG. 2, to access the first carrier A's first base station 106'. The second, simultaneous A-GNSS capability handshake session 110B is within cell 109 with carrier B's cellular base station 108. The device 100 uses its second subscriber identity module (SIM) 230' and its second device modem or transceiver 208' of FIG. 2, to access the second carrier B's base station 108. In an alternate example embodiment shown in FIG. 5, the two SIM modules 230 and 230' share the same RF modem 208.

The wireless device 100 is able to establish its location using the A-GNSS time assistance service provided by either or both carriers A and/or B, since both the carrier A's base station 106' and the carrier B's base station 108 are able to provide the A-GNSS time assistance service. The device 100 obtains at least two different sets of A-GNSS capability information from carrier A's base station 106' and carrier B's base station 108. Optimal A-GNSS features are selected from the A-GNSS capability information from the at least two different wireless carriers and combined into a composite set of optimal A-GNSS features.

Figure 2:
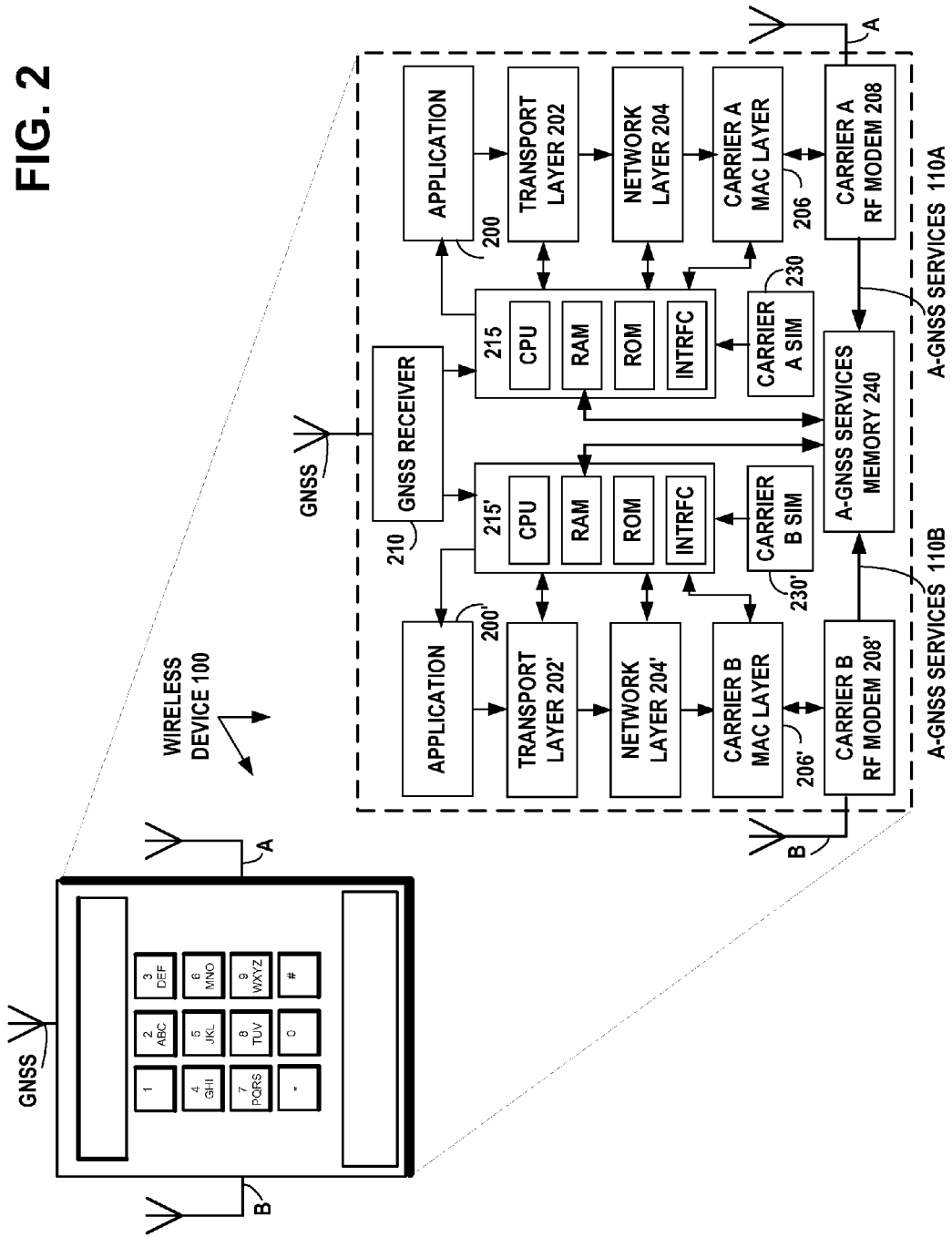
FIG. 2 illustrates a functional block diagram of an example embodiment of the mobile wireless device, showing the GNSS receiver and multi-SIM modem architecture.

FIG. 2 illustrates a functional block diagram of an example embodiment of the mobile wireless device 100, showing the GNSS receiver 210 and multi-SIM modem architecture 230, 230'. The wireless device 100 may be a mobile communications device, PDA, cell phone, laptop or palmtop computer, FM receiver, DVB-H receiver, Emergency Position Indicating Radiobeacon (EPIRB), wireless headset, wearable ubiquitous communications device, or the like. The wireless device 100 may also be an integrated component of a vehicle, such as an automobile, bicycle, airplane, water craft, ship, or other mobile conveyance. The wireless device 100 may be powered by a battery included in the device.

The example embodiment of the wireless device 100 is organized into two sections with a subscriber identity module (SIM) 230 or 230' and RF modem 208 and 208' in each section, to communicate with the two different carriers, A and B. The device 100 may have more than two such sections and more than two SIMs and one or more RF modems to wirelessly communicate with more than two different carriers or with different accounts within the same carrier. One or more GNSS receivers 210 performs position determination by receiving broadcast GNSS satellite data and provides that data to the processors 215 and 215'. The subscriber identity modules (SIM) 230 or 230' provide their respective data to the processors 215 and 215'. Processors 215 and 215' each include one or more CPUs, RAM memory, and ROM memory. The RAM and ROM memories may be removable memory devices such as smart cards, Subscriber Identity Modules (SIMs), Wireless Application Protocol Identity Modules (WIMs), semiconductor memories such as a RAM, ROM, or PROM, flash memory devices, etc. Program instructions may be embodied as program logic stored in the RAM and/or ROM memories in the form of sequences of programmed instructions which may be executed in the CPUs to carry out the functions of the disclosed embodiments. Processors 215 and 215' may each include an interface INTRFC to peripheral devices such as display devices, keypads, pointer devices, speakers, earphones, microphones, headsets, still and/or video cameras, and the like.

Figure 3:
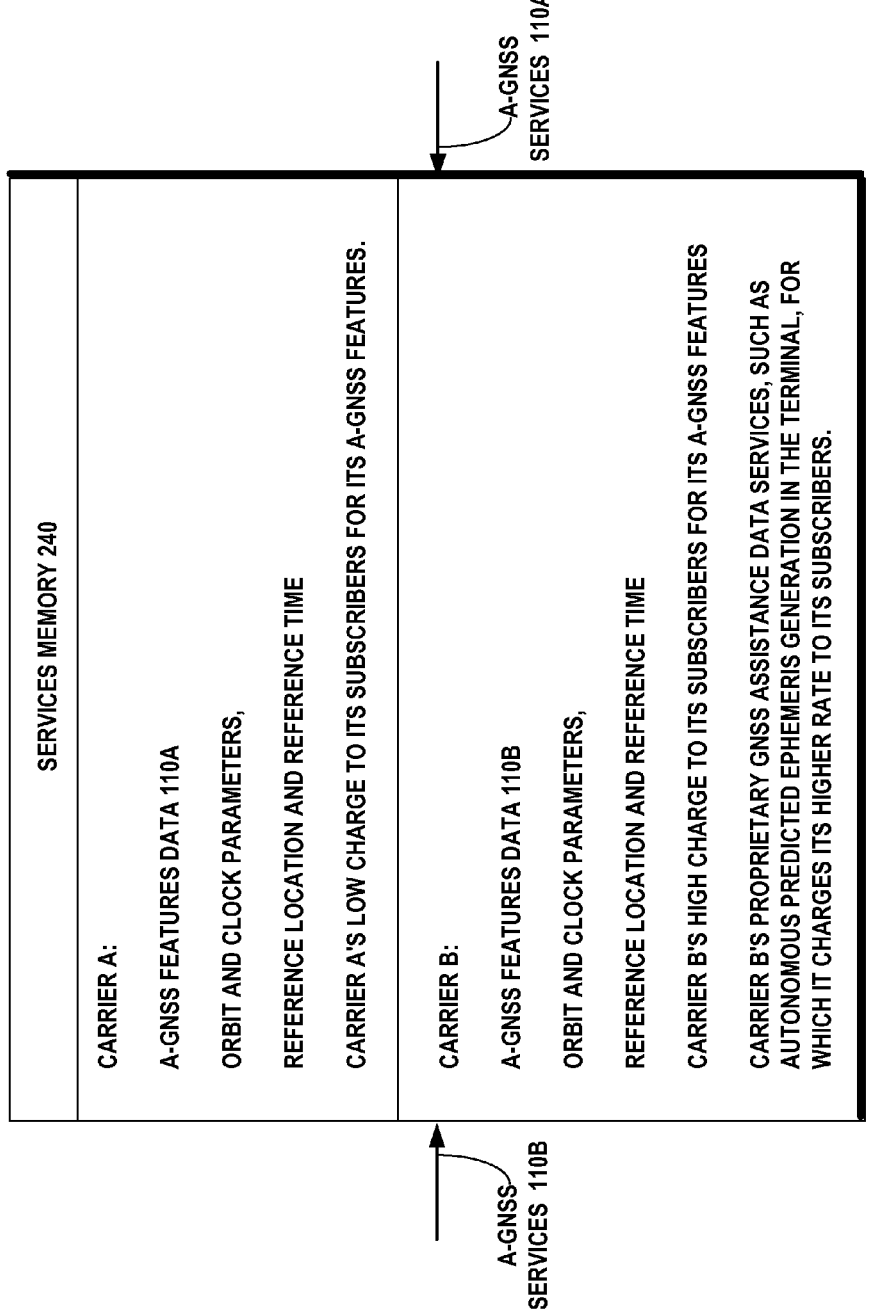
FIG. 3 illustrates a functional block diagram of an A-GNSS services memory in the mobile wireless device of FIG. 2.

The example embodiment of the wireless device 100 includes an A-GNSS services memory 240 coupled to both the first RF modem 208 and the second RF modem 208', configured to store the first A-GNSS features 110A from the first carrier A and second A-GNSS features 110B from the second carrier B. The A-GNSS services memory 240 is connected to and may be a part of the RAM for processors 215 and 215'. FIG. 3 illustrates a functional block diagram of the A-GNSS services memory 240 in the mobile wireless device 100 of FIG. 2. In this example, the A-GNSS services memory 240 will store A-GNSS features data in two partitions, one for carrier A and the other for carrier B. For carrier A, the stored A-GNSS features data 110A includes a standard set of A-GNSS features such as orbit and clock parameters, reference location and reference time and carrier A's charge to its subscribers its A-GNSS features. For carrier B, the stored A-GNSS features data 110B includes a standard set of A-GNSS features such as orbit and clock parameters, reference location and reference time and carrier B's charge to its subscribers its A-GNSS features. In addition, the stored A-GNSS features data 110B includes carrier B's proprietary GNSS assistance data services, such as autonomous predicted ephemeris generation in the terminal, for which it charges its higher rate to its subscribers.

The processors 215 and 215' in device 100 select the standard A-GNSS features from the lower cost carrier A and selects the proprietary A-GNSS features from carrier B. The selection may be based on cost, special requirements of the device 100, positioning accuracy, algorithm speed, time to first fix (TTFF), or other criteria. The selected A-GNSS features are combined into a composite set of optimal A-GNSS features that are stored in the A-GNSS services memory 240 to assist the device 100 in its GNSS operations.

The example embodiment of the wireless device 100 may have a cellular telephone communications protocol stack in each section, to communicate with the two different carriers, A and B. Each respective protocol stack may include one or more application programs 200 and 200', a transport layer 202 and 202', and a network layer 204 and 204'. The protocol stack for carrier A, will include a MAC layer 206 and an RF modem 208 to access and communicate with carrier A. The protocol stack for carrier B, will include a MAC layer 206' and an RF modem 208' to access and communicate with carrier B. The two SIM modules 230 and 230' enable accessing the two different wireless carriers A and B to obtain two different sets of A-GNSS capability information. Program instructions stored in the RAM and/or ROM memories may be executed in the CPUs to carry out a determination of optimal A-GNSS features selected from the A-GNSS capability information from the two different wireless carriers A and B and combine the selected features into a composite set of optimal A-GNSS features.

Figure 4:
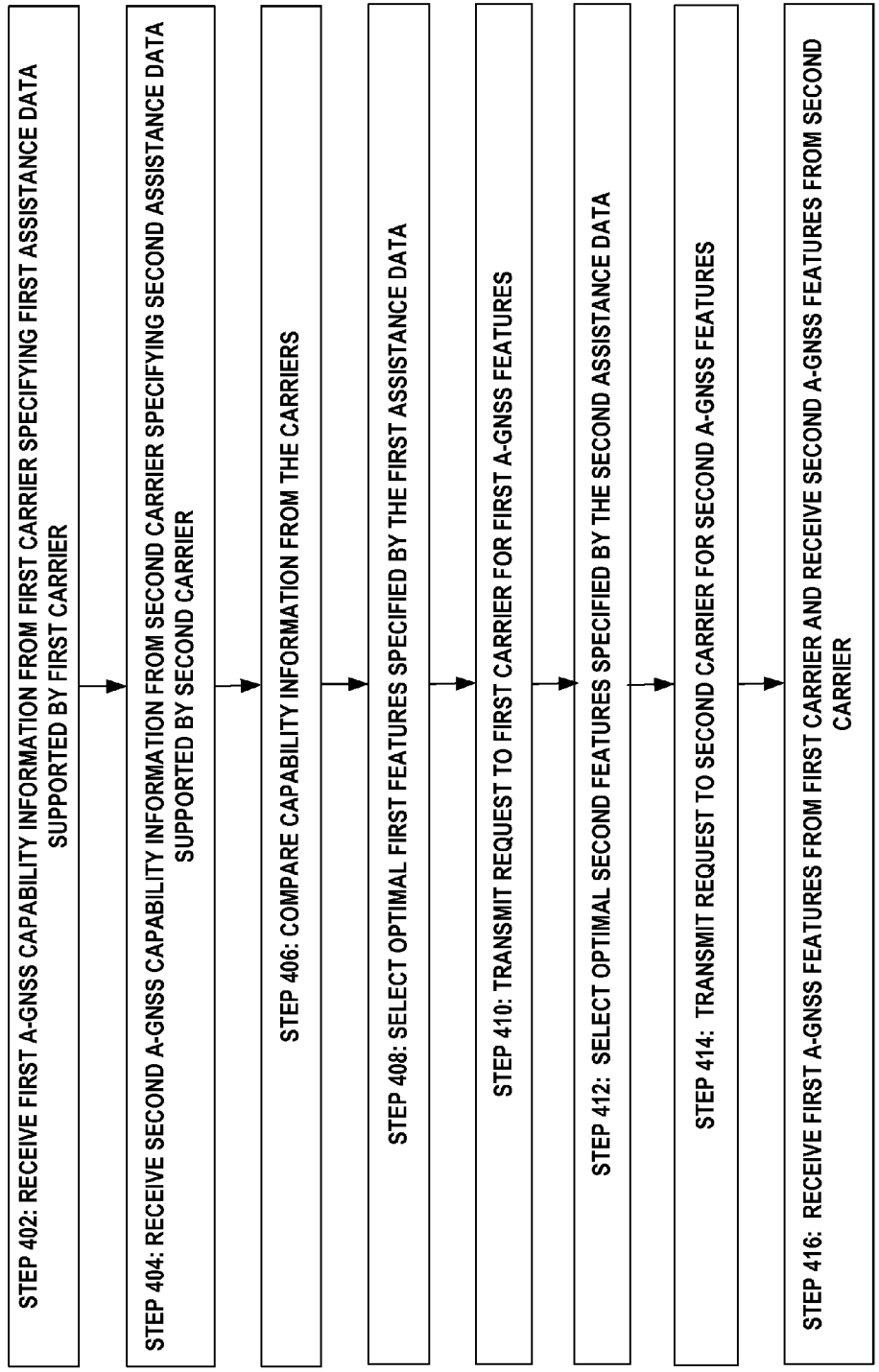
FIG. 4 illustrates a flow diagram of an example embodiment of the process to engage in an A-GNSS capability handshake with the first carrier and an A-GNSS capability handshake with the second carrier.

FIG. 4 illustrates a flow diagram of an example embodiment of the process 400 to engage in an A-GNSS capability handshake with the first carrier and an A-GNSS capability handshake with the second carrier. The steps of the flow diagram represent computer code instructions stored in the RAM and/or ROM memory of the wireless device 100, which when executed by the central processing units (CPU), carry out the functions of the example embodiments of the invention. The steps may be carried out in another order than shown and individual steps may be combined or separated into component steps. The steps of the example method 400 are as follows.

Step 402: Receiving wireless signals by a first RF modem from a first wireless carrier including first A-GNSS capability information specifying first assistance data supported by the first carrier.

Step 404: Receiving wireless signals by a second RF modem from a second wireless carrier including second A-GNSS capability information specifying second assistance data supported by the second carrier.

Step 406: Comparing the first capability information from the first carrier with the second capability information from the second carrier.

Step 408: Selecting optimal first A-GNSS features specified by the first assistance data.

Step 410: Transmitting wireless signals by the first RF modem to the first wireless carrier including a request to the first carrier for the first A-GNSS features.

Step 412: Selecting optimal second A-GNSS features specified by the second assistance data.

Step 414: Transmitting wireless signals by the second RF modem to the second wireless carrier including a request to the second carrier for the second A-GNSS features.

Step 416: Receiving wireless signals by the first RF modem from the first wireless carrier including the first A-GNSS features from the first carrier and receiving wireless signals by the second RF modem from the second wireless carrier including the second A-GNSS features from the second carrier.

Example embodiments of the invention may include a wireless communications device having at least two SIM modules to access two different subscription plans of the same carrier. The wireless communications device may have the following components:

at least a first SIM module configured to access a first subscription plan of a wireless carrier and a second SIM module configured to access a second subscription plan of the wireless carrier;

at least one RF modem configured to communicate with the wireless carrier;

at least one global navigation satellite system (GNSS) receiver;

at least one processor;

at least one memory including computer program code;

the at least one memory and the computer program code configured to, with the at least one processor, cause the apparatus at least to:

cause satellite signals to be received from a global navigation satellite system;

cause wireless signals to be received by the at least one RF modem from the wireless carrier including first assisted GNSS (A-GNSS) capability information specifying first assistance data supported by the first subscription plan;

cause wireless signals to be received by the at least one RF modem from the wireless carrier including second A-GNSS capability information specifying second assistance data supported by the second subscription plan;

select optimal first A-GNSS features specified by the first assistance data for the first subscription plan;

cause wireless signals to be transmitted by the at least one RF modem using the first SIM module to the wireless carrier including a request to the carrier for first A-GNSS features in response to the first assistance data for the first subscription plan;

select optimal second A-GNSS features specified by the second assistance data for the second subscription plan;

cause wireless signals to be transmitted by the at least one RF modem using the second SIM module to the wireless carrier including a request to the carrier for second A-GNSS features in response to the second assistance data for the second subscription plan;

cause wireless signals to be received by the at least one RF modem from the wireless carrier including the first A-GNSS features for the first subscription plan and cause wireless signals to be received by the at least one RF modem from the wireless carrier including the second A-GNSS features for the second subscription plan; and combine the first A-GNSS features for the first subscription plan and the second A-GNSS features for the second subscription plan.

Example embodiments of the invention may include a method for a wireless communications device having at least two SIM modules to access two different subscription plans of the same carrier. The method may have the following steps.

receiving wireless signals from a wireless carrier including first assisted GNSS (A-GNSS) capability information specifying first assistance data supported by a first subscription plan;

receiving wireless signals from the wireless carrier including second A-GNSS capability information specifying second assistance data supported by a second subscription plan;

selecting optimal first A-GNSS features specified by the first assistance data for the first subscription plan;

transmitting wireless signals using a first SIM module to the wireless carrier including a request to the carrier for first A-GNSS features in response to the first assistance data for the first subscription plan;

selecting optimal second A-GNSS features specified by the second assistance data for the second subscription plan;

transmitting wireless signals using a second SIM module to the wireless carrier including a request to the carrier for second A-GNSS features in response to the second assistance data for the second subscription plan;

receiving wireless signals from the wireless carrier including the first A-GNSS features for the first subscription plan and receive wireless signals from the wireless carrier including the second A-GNSS features for the second subscription plan; and combining the first A-GNSS features for the first subscription plan and the second A-GNSS features for the second subscription plan.

Example embodiments of the invention may include a computer readable medium storing program instructions, which when executed by a computer processor, perform the steps of the above recited method.

The program instructions implementing the flow diagram 400 of FIG. 4 may be embodied as program logic stored in the RAM and/or ROM in the form of sequences of programmed instructions which may be executed in the one or more CPUs, to carry out the functions of the disclosed embodiments. The program logic may be delivered to the writeable RAM, ROM, PROM, flash memory device, etc. of the apparatus from a computer program product or article of manufacture in the form of computer-usable media such as resident memory devices, smart cards or other removable memory devices. Alternately, the program instructions implementing the flow diagram 400 may be embodied as integrated circuit logic in the form of programmed logic arrays or custom designed application specific integrated circuits (ASIC).

Figure 5:
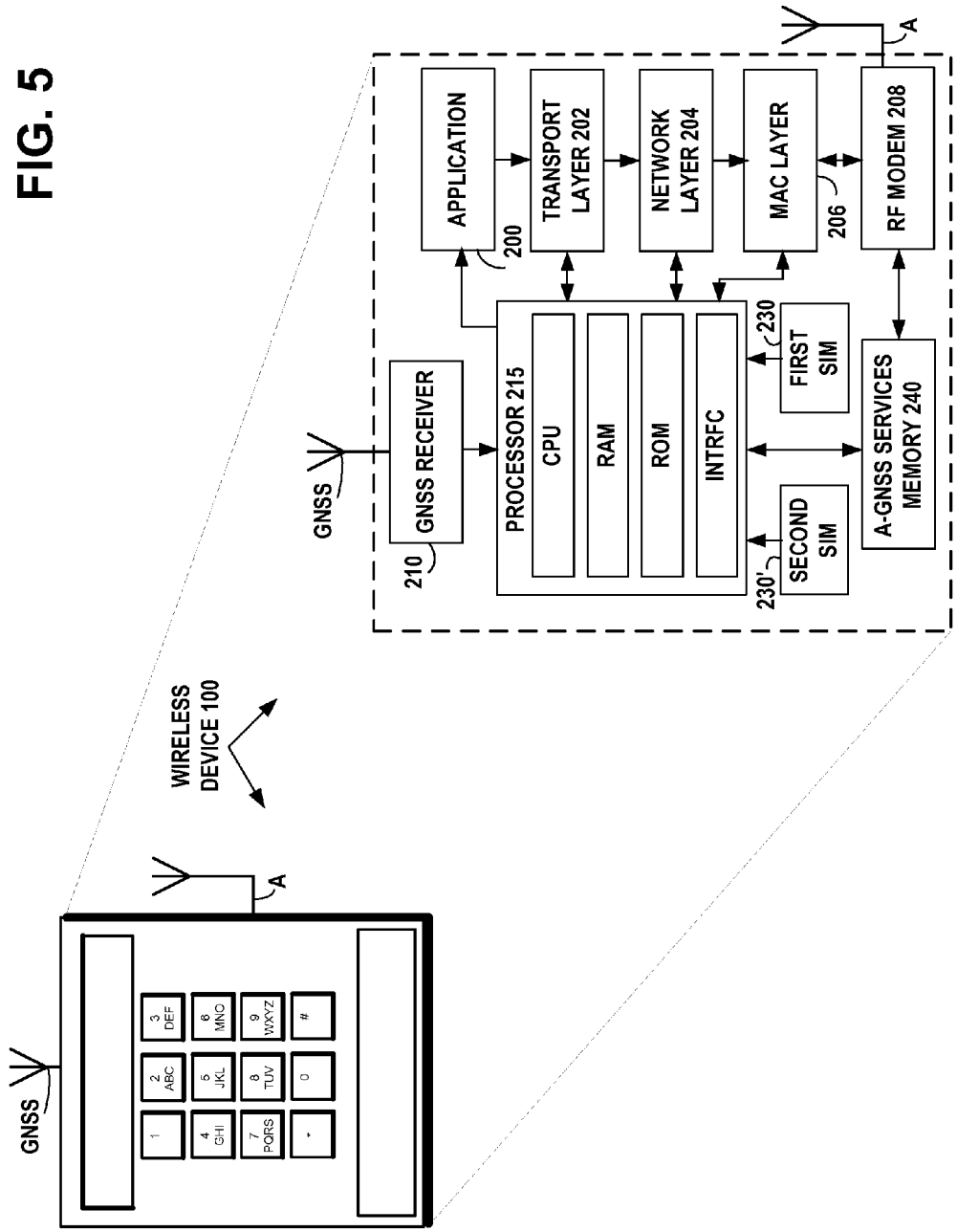
FIG. 5 illustrates a functional block diagram of another example embodiment of a multi-SIM mobile wireless device having an A-GNSS location detection capability, with a single RF modem that may communicate with two or more carriers that use communication protocols that are compatible with the RF modem or with two different subscription plans of the same carrier.

FIG. 5 illustrates a functional block diagram of another example embodiment of a multi-SIM mobile wireless device 100 having an A-GNSS location detection capability, with a single RF modem 208 that may communicate with two or more carriers that use communication protocols that are compatible with the RF modem 208 or with two different subscription plans of the same carrier. Example embodiments of the invention may include the wireless device 100 of FIG. 5 having at least two SIM modules that share the same RF modem. The first SIM module is configured to access first information of a first wireless carrier database and the second SIM module is configured to access second information of a second wireless carrier database. In an embodiment of the wireless device 100 of FIG. 5, the first wireless carrier database and the second wireless carrier database are operated by the same carrier. In another embodiment of the wireless device 100 of FIG. 5, the first wireless carrier database and the second wireless carrier database are operated by the same carrier and the first database and the second database are component parts of the same database. In another embodiment of the wireless device 100 of FIG. 5, the first wireless carrier database is operated by a first wireless carrier and the second wireless carrier database is operated by a second wireless carrier different from the first wireless carrier.

The multi-SIM mobile wireless device 100 of FIG. 5 may operate in a geographical area served by two or more different cellular wireless carriers operating in non-overlapping portions of the radio spectrum. The wireless device 100 of FIG. 5 has a single RF modem 208 that may communicate with the two or more carriers that use communication protocols that are compatible with the RF modem 208. For example, the two or more carriers may be cellular telephone networks using network a protocol such as GERAN (GSM EDGE Radio Access Network) operating in non-overlapping portions of the radio spectrum. The wireless two or more carriers may also be wireless local area networks (WLAN) using any one of the IEEE 802.11 WLAN protocols or HyperLAN protocols.

The example wireless device 100 of FIG. 5 includes two subscriber identity modules (SIM) 230 and 230' to use to communicate with the two or more carriers. The device 100 may have more than two SIMs to wirelessly communicate with more than two different carriers or with different accounts within the same carrier. One or more GNSS receivers 210 performs position determination by receiving broadcast GNSS satellite data and provides that data to the processor 215. The subscriber identity modules (SIM) 230 or 230' provide their respective data to the processor 215. Processor 215 includes one or more CPUs, RAM memory, and ROM memory. Program instructions may be embodied as program logic stored in the RAM and/or ROM memories in the form of sequences of programmed instructions which may be executed in the CPUs to carry out the functions of the disclosed embodiments. Processor 215 may include an interface INTRFC to peripheral devices such as display devices, keypads, pointer devices, speakers, earphones, microphones, headsets, still and/or video cameras, and the like.

The example embodiment of the wireless device 100 of FIG. 5 may have a cellular telephone communications protocol stack to communicate with the two or more carriers. The protocol stack may include one or more application programs 200, a transport layer 202, and a network layer 204. The protocol stack will include a MAC layer 206 and an RF modem 208 access and communicate with the two or more carriers. Either one or both of the carrier's base stations provides cellular transmit frames to the wireless device 100 to establish a time reference for fast switching between the first SIM 230 and the second SIM 230' to access base stations of the two or more carriers. The GNSS clock, for example, may be used as a time base for fast switching between the first SIM 230 and the second SIM 230'.

The example embodiment of the wireless device 100 of FIG. 5 includes an A-GNSS services memory 240 of FIG. 3, coupled the RF modem 208, configured to store the first A-GNSS features 110A from the first carrier A and second A-GNSS features 110B from the second carrier B. The A-GNSS services memory 240 is connected to and may be a part of the RAM for processor 215. FIG. 3 illustrates a functional block diagram of the A-GNSS services memory 240 in the mobile wireless device 100 of FIG. 5. In this example, the A-GNSS services memory 240 will store A-GNSS features data in two partitions, one for carrier A and the other for carrier B. For carrier A, the stored A-GNSS features data 110A includes a standard set of A-GNSS features such as orbit and clock parameters, reference location and reference time and carrier A's charge to its subscribers its A-GNSS features. For carrier B, the stored A-GNSS features data 110B includes a standard set of A-GNSS features such as orbit and clock parameters, reference location and reference time and carrier B's charge to its subscribers its A-GNSS features. In addition, the stored A-GNSS features data 110B includes carrier B's proprietary GNSS assistance data services, such as autonomous predicted ephemeris generation in the terminal, for which it charges its higher rate to its subscribers.

The processor 215 in device 100 of FIG. 5, selects the standard A-GNSS features from the lower cost carrier A and selects the proprietary A-GNSS features from carrier B. The selection may be based on cost, special requirements of the device 100, positioning accuracy, algorithm speed, time to first fix (TTFF), or other criteria. The selected A-GNSS features are combined into a composite set of optimal A-GNSS features that are stored in the A-GNSS services memory 240 to assist the device 100 in its GNSS operations.

Example embodiments of the invention may include the wireless device 100 of FIG. 5 having at least two SIM modules 230 and 230' that share the same RF modem 208. The first SIM module 230 is configured to access first information of a first wireless carrier database 306A and/or 315A of FIGS. 1A, 1B, and 1C and the second SIM module 230' is configured to access second information of a second wireless carrier database 306B and/or 315B of FIGS. 1A, 1B, and 1C. In an example embodiment of the invention, the first wireless carrier database 306A and/or 315A and the second wireless carrier database 306B and/or 315B are operated by the same carrier, for example carrier A. In another example embodiment of the invention, the first wireless carrier database 306A and/or 315A and the second wireless carrier database 306B and/or 315B are operated by the same carrier, for example carrier A, and the first database 306A and/or 315A and the second database 306B and/or 315B are component parts of the same composite database of carrier A. In another example embodiment of the invention, the first wireless carrier database 306A and/or 315A is operated by a first wireless carrier A and the second wireless carrier database 306B and/or 315B is operated by a second wireless carrier B different from the first wireless carrier A. The example wireless communications device 100 of FIG. 5 may have the following components:

a first SIM module 230 configured to access first information of a first wireless carrier database 306A and/or 315A and a second SIM module 230' configured to access second information of a second wireless carrier database 306B and/or 315B;

an RF modem 208 shared by the first 230 and second 230' SIM modules, configured to communicate with the first wireless carrier database 306A and/or 315A and the second wireless carrier database 306B and/or 315B;

at least one global navigation satellite system (GNSS) receiver 210;

at least one processor 215;

at least one memory RAM, ROM, and/or memory 240, including computer program code (flow diagram 450 of FIG. 6);

the at least one memory and the computer program code configured to, with the at least one processor, cause the apparatus at least to:

cause satellite signals to be received from a global navigation satellite system;

cause wireless signals to be received by the shared RF modem from the first wireless carrier database including first assisted GNSS (A-GNSS) capability information specifying first assistance data;

cause wireless signals to be received by the shared RF modem from the second wireless carrier database including second A-GNSS capability information specifying second assistance data;

select optimal first A-GNSS features specified by the first assistance data;

cause wireless signals to be transmitted by the shared RF modem using the first SIM module to the first wireless carrier database including a request for first A-GNSS features in response to the first assistance data;

select optimal second A-GNSS features specified by the second assistance data;

cause wireless signals to be transmitted by the shared RF modem using the second SIM module to the second wireless carrier database including a request for second A-GNSS features in response to the second assistance data;

cause wireless signals to be received by the shared RF modem from the first wireless carrier database including the first A-GNSS features and cause wireless signals to be received by the shared RF modem from the second wireless carrier database including the second A-GNSS features; and combine the first A-GNSS features and the second A-GNSS features.

FIG. 6 illustrates a flow diagram 450 of an example embodiment of the process to engage in an A-GNSS capability handshake by the wireless device 100 of FIG. 5 having at least two SIM modules 230 and 230' that share the same RF modem 208. The first SIM module 230 is configured to access first information of a first wireless carrier database 306A and/or 315A of FIGS. 1A, 1B, and 1C and the second SIM module 230' is configured to access second information of a second wireless carrier database 306B and/or 315B of FIGS. 1A, 1B, and 1C. In an example embodiment of the invention, the first wireless carrier database 306A and/or 315A and the second wireless carrier database 306B and/or 315B are operated by the same carrier, for example carrier A. In another example embodiment of the invention, the first wireless carrier database 306A and/or 315A and the second wireless carrier database 306B and/or 315B are operated by the same carrier, for example carrier A, and the first database 306A and/or 315A and the second database 306B and/or 315B are component parts of the same composite database of carrier A. In another example embodiment of the invention, the first wireless carrier database 306A and/or 315A is operated by a first wireless carrier A and the second wireless carrier database 306B and/or 315B is operated by a second wireless carrier B different from the first wireless carrier A. The steps of the flow diagram 450 of FIG. 6 represent computer code instructions stored in the RAM and/or ROM memory of the wireless device 100, which when executed by the central processing units (CPU), carry out the functions of the example embodiments of the invention. The steps may be carried out in another order than shown and individual steps may be combined or separated into component steps. The example method of FIG. 6 may have the following steps.

Step 452: receiving wireless signals by the shared RF modem from the first wireless carrier database including first assisted GNSS (A-GNSS) capability information specifying first assistance data;

Step 454: receiving wireless signals by the shared RF modem from the second wireless carrier database including second A-GNSS capability information specifying second assistance data;

Step 456: selecting optimal first A-GNSS features specified by the first assistance data;

Step 458: transmitting wireless signals by the shared RF modem using the first SIM module to the first wireless carrier database including a request for first A-GNSS features in response to the first assistance data;

Step 460: selecting optimal second A-GNSS features specified by the second assistance data;

Step 462: transmitting wireless signals by the shared RF modem using the second SIM module to the second wireless carrier database including a request for second A-GNSS features in response to the second assistance data;

Step 464: receiving wireless signals by the shared RF modem from the first wireless carrier database including the first A-GNSS features and receiving wireless signals by the shared RF modem from the second wireless carrier database including the second A-GNSS features; and Step 466: combining the first A-GNSS features and the second A-GNSS features.

Using the description provided herein, the embodiments may be implemented as a machine, process, or article of manufacture by using standard programming and/or engineering techniques to produce programming software, firmware, hardware or any combination thereof.

Any resulting program, having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that is stored permanently or temporarily on any computer-usable medium.

Although specific example embodiments have been disclosed, a person skilled in the art will understand that changes can be made to the specific example embodiments without departing from the spirit and scope of the invention.

What is claimed is:

1. An apparatus, comprising:
   at least a first SIM module configured to access a first wireless carrier and a second SIM module configured to access a second wireless carrier;
   at least a first RF modem configured to communicate with the first wireless carrier and a second RF modem configured to communicate with the second wireless carrier;
   at least one global navigation satellite system (GNSS) receiver;
   at least one processor;
   at least one memory including computer program code;
   the at least one memory and the computer program code configured to, with the at least one processor, cause the apparatus at least to:
   cause satellite signals to be received from a global navigation satellite system;
   cause wireless signals to be received by the first RF modem from the first wireless carrier including first assisted GNSS (A-GNSS) capability information specifying first assistance data supported by the first carrier;
   cause wireless signals to be received by the second RF modem from the second wireless carrier including second A-GNSS capability information specifying second assistance data supported by the second carrier;
   select optimal first A-GNSS features specified by the first assistance data;
   cause wireless signals to be transmitted by the first RF modem to the first wireless carrier including a request to the first carrier for first A-GNSS features;
   select optimal second A-GNSS features specified by the second assistance data;
   cause wireless signals to be transmitted by the second RF modem to the second wireless carrier including a request to the second carrier for second A-GNSS features;
   cause wireless signals to be received by the first RF modem from the first wireless carrier including the first A-GNSS features from the first carrier; and
   cause wireless signals to be received by the second RF modem from the second wireless carrier including the second A-GNSS features from the second carrier.

2. The apparatus of claim 1, wherein the first and second wireless carriers are cellular telephone carriers.

3. The apparatus of claim 1, wherein the apparatus and the first wireless carrier engage in an A-GNSS capability handshake and the apparatus and the second wireless carrier engage in an A-GNSS capability handshake.

4. The apparatus of claim 1, further comprising:
   an A-GNSS services memory in the apparatus coupled to both the first RF modem and the second RF modem, configured to store the first A-GNSS features from the first carrier and second A-GNSS features from the second carrier.

5. The apparatus of claim 1, further comprising:
   the at least one memory and the computer program code configured to, with the at least one processor, cause the apparatus at least to:
   combine the first A-GNSS features from the first carrier and the second A-GNSS features from the second carrier.

6. The apparatus of claim 1, wherein the first and second wireless carriers are wireless local area networks using an IEEE 802.11 protocol or a HyperLAN protocol.

7. The apparatus of claim 1, wherein the selection of optimal A-GNSS features may be based on cost, special requirements of the wireless device, positioning accuracy, algorithm speed, or time to first fix.

8. A method, comprising:
receiving wireless signals by a first RF modem from a first wireless carrier including first assisted global navigation satellite system (A-GNSS) capability information specifying first assistance data supported by the first carrier;
receiving wireless signals by a second RF modem from a second wireless carrier including second A-GNSS capability information specifying second assistance data supported by the second carrier;
selecting optimal first A-GNSS features specified by the first assistance data;
transmitting wireless signals by the first RF modem to the first wireless carrier including a request to the first carrier for the first A-GNSS features;
selecting optimal second A-GNSS features specified by the second assistance data;
transmitting wireless signals by the second RF modem to the second wireless carrier including a request to the second carrier for the second A-GNSS features;
receiving wireless signals by the first RF modem from the first wireless carrier including the first A-GNSS features from the first carrier; and
receiving wireless signals by the second RF modem from the second wireless carrier including the second A-GNSS features from the second carrier.

9. The method of claim 8, wherein the first and second wireless carriers are cellular telephone carriers.

10. The method of claim 8, further comprising:
engaging with the first wireless carrier in an A-GNSS capability handshake to receive the first A-GNSS capability information; and
engaging with the second wireless carrier engage in an A-GNSS capability handshake to receive the second A-GNSS capability information.

11. The method of claim 8, further comprising:
storing the first A-GNSS features from the first carrier and the second A-GNSS features from the second carrier.

12. The method of claim 8, further comprising:
combining the first A-GNSS features from the first carrier and the second A-GNSS features from the second carrier.

13. The method of claim 8, wherein the first and second wireless carriers are wireless local area networks using an IEEE 802.11 protocol or a HyperLAN protocol.

14. The method of claim 8, wherein the selection of optimal A-GNSS features may be based on cost, special requirements of the wireless device, positioning accuracy, algorithm speed, or time to first fix.

15. A computer readable medium storing program instructions, which when executed by a computer processor, perform the method of:
receiving wireless signals by a first RF modem from a first wireless carrier including first assisted global navigation satellite system (A-GNSS) capability information specifying first assistance data supported by the first carrier;
receiving wireless signals by a second RF modem from a second wireless carrier including second A-GNSS capability information specifying second assistance data supported by the second carrier;
selecting optimal first A-GNSS features specified by the first assistance data;
transmitting wireless signals by the first RF modem to the first wireless carrier including a request to the first carrier for the first A-GNSS features;
selecting optimal second A-GNSS features specified by the second assistance data;
transmitting wireless signals by the second RF modem to the second wireless carrier including a request to the second carrier for the second A-GNSS features;
receiving wireless signals by the first RF modem from the first wireless carrier including the first A-GNSS features from the first carrier; and
receiving wireless signals by the second RF modem from the second wireless carrier including the second A-GNSS features from the second carrier.

16. The computer readable medium storing program instructions of claim 15, wherein the first and second wireless carriers are wireless local area networks using an IEEE 802.11 protocol or a HyperLAN protocol.

17. The computer readable medium storing program instructions of claim 15, wherein the selection of optimal A-GNSS features may be based on cost, special requirements of the wireless device, positioning accuracy, algorithm speed, or time to first fix.

18. An apparatus, comprising:
means for receiving satellite signals from a global navigation satellite system;
means for receiving wireless signals by a first RF modem from a first wireless carrier including first assisted global navigation satellite system (A-GNSS) capability information specifying first assistance data supported by the first carrier;
means for receiving wireless signals by a second RF modem from a second wireless carrier including second A-GNSS capability information specifying second assistance data supported by the second carrier;
means for selecting optimal first A-GNSS features specified by the first assistance data;
means for transmitting wireless signals by the first RF modem to the first wireless carrier including a request to the first carrier for the first A-GNSS features;
means for selecting optimal second A-GNSS features specified by the second assistance data;
means for transmitting wireless signals by the second RF modem to the second wireless carrier including a request to the second carrier for the second A-GNSS features;
means for receiving wireless signals by the first RF modem from the first wireless carrier including the first A-GNSS features from the first carrier; and
means for receiving wireless signals by the second RF modem from the second wireless carrier including the second A-GNSS features from the second carrier.

19. An apparatus, comprising:
at least a first SIM module configured to access a first subscription plan of a wireless carrier and a second SIM module configured to access a second subscription plan of the wireless carrier;
at least one RF modem configured to communicate with the wireless carrier;
at least one global navigation satellite system (GNSS) receiver;
at least one processor;
at least one memory including computer program code;
the at least one memory and the computer program code configured to, with the at least one processor, cause the apparatus at least to:
cause satellite signals to be received from a global navigation satellite system;

cause wireless signals to be received by the at least one RF modem from the wireless carrier including first assisted GNSS (A-GNSS) capability information specifying first assistance data supported by the first subscription plan;

cause wireless signals to be received by the at least one RF modem from the wireless carrier including second A-GNSS capability information specifying second assistance data supported by the second subscription plan;

select optimal first A-GNSS features specified by the first assistance data for the first subscription plan;

cause wireless signals to be transmitted by the at least one RF modem using the first SIM module to the wireless carrier including a request to the carrier for first A-GNSS features in response to the first assistance data for the first subscription plan;

select optimal second A-GNSS features specified by the second assistance data for the second subscription plan;

cause wireless signals to be transmitted by the at least one RF modem using the second SIM module to the wireless carrier including a request to the carrier for second A-GNSS features in response to the second assistance data for the second subscription plan;

cause wireless signals to be received by the at least one RF modem from the wireless carrier including the first A-GNSS features for the first subscription plan and cause wireless signals to be received by the at least one RF modem from the wireless carrier including the second A-GNSS features for the second subscription plan; and combine the first A-GNSS features for the first subscription plan and the second A-GNSS features for the second subscription plan.

20. A method, comprising:

receiving wireless signals from a wireless carrier including first assisted GNSS (A-GNSS) capability information specifying first assistance data supported by a first subscription plan;

receiving wireless signals from the wireless carrier including second A-GNSS capability information specifying second assistance data supported by a second subscription plan;

selecting optimal first A-GNSS features specified by the first assistance data for the first subscription plan;

transmitting wireless signals using a first SIM module to the wireless carrier including a request to the carrier for first A-GNSS features in response to the first assistance data for the first subscription plan;

selecting optimal second A-GNSS features specified by the second assistance data for the second subscription plan;

transmitting wireless signals using a second SIM module to the wireless carrier including a request to the carrier for second A-GNSS features in response to the second assistance data for the second subscription plan;

receiving wireless signals from the wireless carrier including the first A-GNSS features for the first subscription plan and receive wireless signals from the wireless carrier including the second A-GNSS features for the second subscription plan; and combining the first A-GNSS features for the first subscription plan and the second A-GNSS features for the second subscription plan.

21. An apparatus, comprising:
a first SIM module configured to access first information of a first wireless carrier database and a second SIM module configured to access second information of a second wireless carrier database;
an RF modem shared by the first and second SIM modules, configured to communicate with the first wireless carrier database and the second wireless carrier database;
at least one global navigation satellite system (GNSS) receiver;
at least one processor;
at least one memory including computer program code;
the at least one memory and the computer program code configured to, with the at least one processor, cause the apparatus at least to:
cause satellite signals to be received from a global navigation satellite system;
cause wireless signals to be received by the shared RF modem from the first wireless carrier database including first assisted GNSS (A-GNSS) capability information specifying first assistance data;
cause wireless signals to be received by the shared RF modem from the second wireless carrier database including second A-GNSS capability information specifying second assistance data;
select optimal first A-GNSS features specified by the first assistance data;
cause wireless signals to be transmitted by the shared RF modem using the first SIM module to the first wireless carrier database including a request for first A-GNSS features in response to the first assistance data;
select optimal second A-GNSS features specified by the second assistance data;
cause wireless signals to be transmitted by the shared RF modem using the second SIM module to the second wireless carrier database including a request for second A-GNSS features in response to the second assistance data;
cause wireless signals to be received by the shared RF modem from the first wireless carrier database including the first A-GNSS features and cause wireless signals to be received by the shared RF modem from the second wireless carrier database including the second A-GNSS features; and
combine the first A-GNSS features and the second A-GNSS features.

22. The apparatus of claim 21, wherein the first wireless carrier database and the second wireless carrier database are operated by the same wireless carrier.

23. The apparatus of claim 21, wherein the first wireless carrier database and the second wireless carrier database are operated by the same wireless carrier and the first database and the second database are component parts of the same database.

24. The apparatus of claim 21, wherein the first wireless carrier database is operated by a first wireless carrier and the second wireless carrier database is operated by a second wireless carrier different from the first wireless carrier.

* * * * *